United States Patent [19]

Abdel-Malek et al.

[11] Patent Number: 5,619,998
[45] Date of Patent: Apr. 15, 1997

[54] ENHANCED METHOD FOR REDUCING ULTRASOUND SPECKLE NOISE USING WAVELET TRANSFORM

[75] Inventors: Aiman A. Abdel-Malek, Schenectady; Kenneth W. Rigby, Clifton Park, both of N.Y.

[73] Assignee: General Electric Company, Schenectady, N.Y.

[21] Appl. No.: 613,552

[22] Filed: Mar. 11, 1996

Related U.S. Application Data

[63] Continuation-in-part of Ser. No. 311,698, Sep. 23, 1994, Pat. No. 5,497,777.
[51] Int. Cl.$^6$ .................................................... A61B 8/00
[52] U.S. Cl. ........................................................ 128/660.07
[58] Field of Search .................... 128/660.06, 660.07, 128/661.01; 73/626; 382/276; 364/413.25

[56] References Cited

U.S. PATENT DOCUMENTS

| | | | |
|---|---|---|---|
| 5,253,350 | 10/1993 | Letcher, III | 128/660.06 |
| 5,262,958 | 11/1993 | Chui et al. | 364/487 |
| 5,497,777 | 3/1996 | Abdel-Malek et al. | 128/660.07 |

OTHER PUBLICATIONS

Daubechies, "Orthonormal Bases of Compactly, Supported Wavelets", Commun. Pure & Applied Math., vol. XLI, pp. 909–996 (1988).

Daubechies, "The Wavelet Transform, Time–Frequency Localization and Signal Analysis", Trans. Inform. Theory, vol. 36, No. 5, 961–1005 (Sep. 1990).

Press et al., Numerical Recipes in FORTRAN, The Art of Scientific Computing, 2nd Ed., Cambridge Univ. Press, pp. 584–599 (1992).

*Primary Examiner*—Francis Jaworski
*Attorney, Agent, or Firm*—Marvin Snyder

[57] ABSTRACT

Signal-dependent noise in a coherent imaging system signal, such as in medical ultrasound imaging, is reduced by filtering speckle noise using nonlinear adaptive thresholding of received echo wavelet transform coefficients, thereby enhancing the resultant image by improving the signal-to-noise ratio. The method includes the steps of dividing the imaging system signal into a number of subinterval signals of equal length; transforming each subinterval signal using discrete wavelet transformation to provide wavelet transform coefficients for each of a plurality of wavelet scales having different levels of resolution ranging from a finest wavelet scale to a coarsest wavelet scale: deleting all of the wavelet transform coefficients representing the finest wavelet scale: for each wavelet scale other than the finest wavelet scale, identifying for each subinterval signal which of the wavelet transform coefficients are related to noise and which are related to a true signal through the use of adaptive nonlinear thresholding; selecting those wavelet transform coefficients which are identified as being related to a true signal; and setting to zero those wavelet coefficients which are identified as being related to noise: inverse transforming the modified wavelet transform coefficients using an inverse discrete wavelet transformation to provide an enhanced true signal with reduced noise.

11 Claims, 11 Drawing Sheets

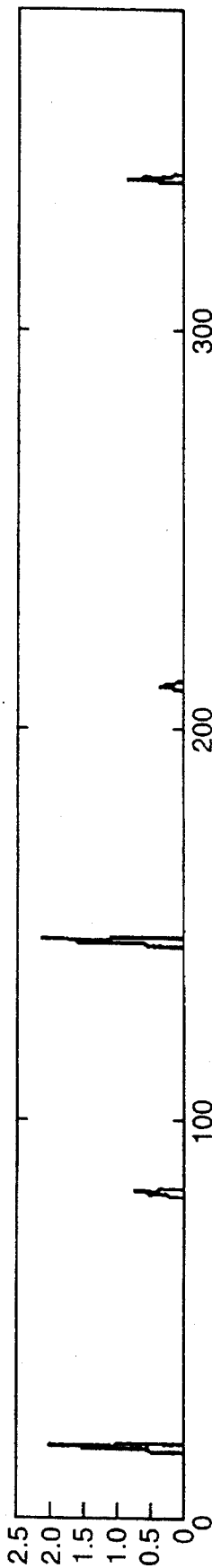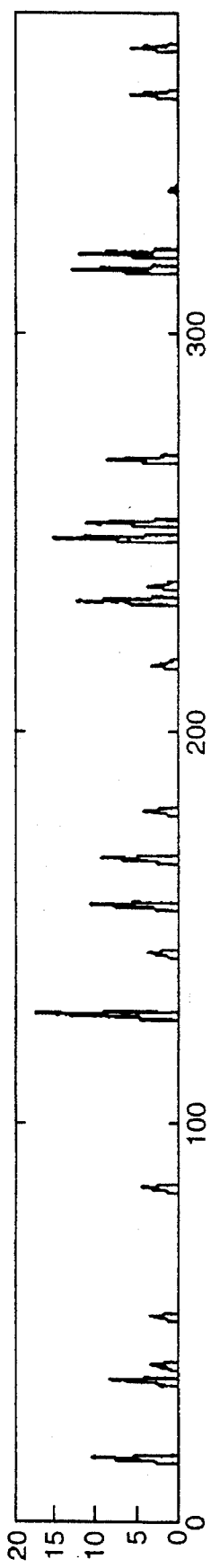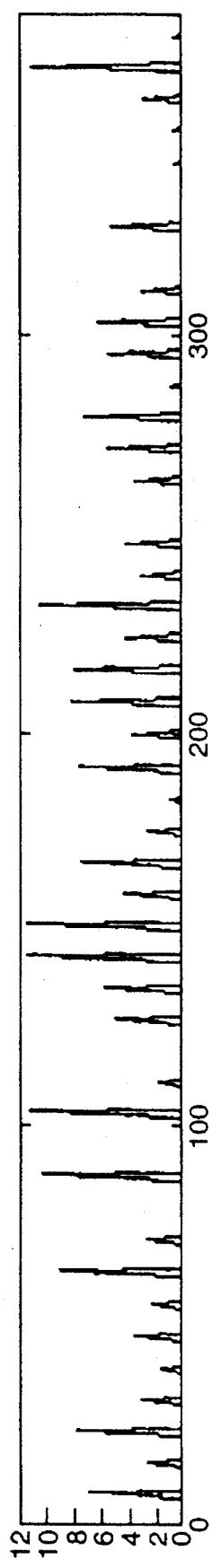

ENHANCED METHOD FOR REDUCING ULTRASOUND SPECKLE NOISE USING WAVELET TRANSFORM

RELATED PATENT APPLICATION

This application is a continuation-in-part application of U.S. Pat. application Ser. No. 08/311,698 filed on Sept. 23, 1994, which issued on Mar. 12, 1996 as U.S. Pat. No. 5,497,777.

FIELD OF THE INVENTION

This invention generally relates to coherent or in-phase imaging using vibratory energy, such as ultrasound imaging. In particular, the invention relates to the filtering of signal-dependent noise such as speckle noise to enhance the imaging signal.

BACKGROUND OF THE INVENTION

There are a number of methods in which vibratory energy, such as ultrasound, is used to produce images of objects, such as in medical applications for imaging internal areas of patients for diagnostic purposes. An ultrasonic transducer array is used for both transmission and reception of ultrasonic pulses with an image produced in which the brightness of each pixel of the image is a function of the amplitude of the ultrasound reflected from the imaged object to the receiver, which in turn is determined by differences in characteristics or materials of the object being imaged.

A typical ultrasonic probe for medical applications comprises a transducer array made up of a multiplicity of piezoelectric elements, each element being sandwiched between a respective ground electrode and respective signal electrode. When an appropriate voltage pulse is applied, the piezoelectric element emits an ultrasonic pulse into the medium of interest, such as the body of a patient. Conversely, when an ultrasonic echo pulse strikes the piezoelectric element, the piezoelectric element produces a corresponding voltage across its electrodes.

The piezoelectric elements of a typical ultrasonic probe are arranged in an array such that by properly controlling relative time delays of the applied voltages on each element, the ultrasonic waves produced by the piezoelectric elements can be made to combine to produce a net ultrasonic wave focused at a selected point. This focal point can be moved on each successive transmitter firing, so that the transmitted beams can be scanned across the object without moving the probe.

Similar principles apply when the probe is employed to receive the reflected sound. The voltages produced at the transducer elements in the array are individually delayed in time and then summed together such that the net received signal or "beamsum" is dominated by the received sound reflected from a single receive focal point in the object. The individual pixels, when combined, provide an image of the object, such as a fetus or an internal organ of the human body.

Any noise or incoherent signals present in the beamsum signal detracts from the image quality through destructive interference. Therefore, various methods of filtering noise out of the received signal to enhance image presentation and imaging have been used or attempted. However, present filtering methods are not completely satisfactory. Signal-dependent noise such as speckle noise commonly observed in coherent imaging systems such as ultrasound systems for medical and industrial purposes and even in synthetic aperture radar and laser imaging—cannot be properly or adequately handled by conventional filtering techniques. On an ultrasound image, speckle noise visually appears similar to the familiar "snow" or noise spotting of television images provided by a home television receiver.

Conventional techniques for filtering additive noise in ultrasound imaging often fail if the noise is multiplicative or signal dependent. In many applications, particularly medical ultrasound imaging, loss of the true or information-containing signal as a result of the filtering operation is highly undesirable or unacceptable for diagnostic imaging. Noise filtering techniques based on Fourier analysis assume that the noise is dominant in the higher frequencies. Such assumption is often crude and inaccurate for various types of signals. Various attempts to remove speckle noise have not been satisfactory. Therefore, a key feature of denoising ultrasound signals is to retain important signal information while removing as much of the noise as possible to improve the signal-to-noise ratio.

SUMMARY OF THE INVENTION

The present invention is an adaptive method for reducing signal-dependent noise, such as speckle noise, in a coherent imaging system signal such as in medical ultrasound imaging. Speckle noise is filtered using nonlinear adaptive thresholding of received echo wavelet transform coefficients. Filtering speckle noise in ultrasound imaging enhances the resultant image by improving the signal-to-noise ratio. Circuitry for performing the technique of the invention can be retrofitted or added to existing ultrasound equipment, whether digital or analog based.

In particular, the method comprises the steps of dividing the imaging signal into a number of overlapping subinterval signals of equal lengths; transforming each of the subintervals using a discrete wavelet technique; identifying for each subinterval whether the wavelet transform coefficient is related to noise or to the true or information-carrying signal; selecting those wavelet coefficients which are identified as being related to the true signal; deleting those coefficients that relate to noise; and passing the remaining wavelet coefficients through an inverse discrete wavelet transform to provide an enhanced signal with reduced noise.

The imaging signal is divided into selected frequency and time intervals. Identification of those wavelet coefficients related to the information-carrying signal is provided automatically through a threshold factor determination which automatically varies the threshold for each wavelet scale, thereby enabling automatic identification of signal-related wavelet coefficients.

The method of the present invention is robust in the sense that minimal assumptions about the noise characteristics are imposed, which enables a wider variety of noise to be filtered. In addition, the technique allows effective discrimination of noise and signal, thus permitting preservation of the important features of the signal of interest.

BRIEF DESCRIPTION OF THE DRAWINGS

FIGS. 10A through 10G are plots of the wavelet coefficients of the filtered data shown in FIG. 9B for wavelet scales 0 through 6, respectively.

DETAILED DESCRIPTION OF THE PREFERRED EMBODIMENTS

Figure 1:
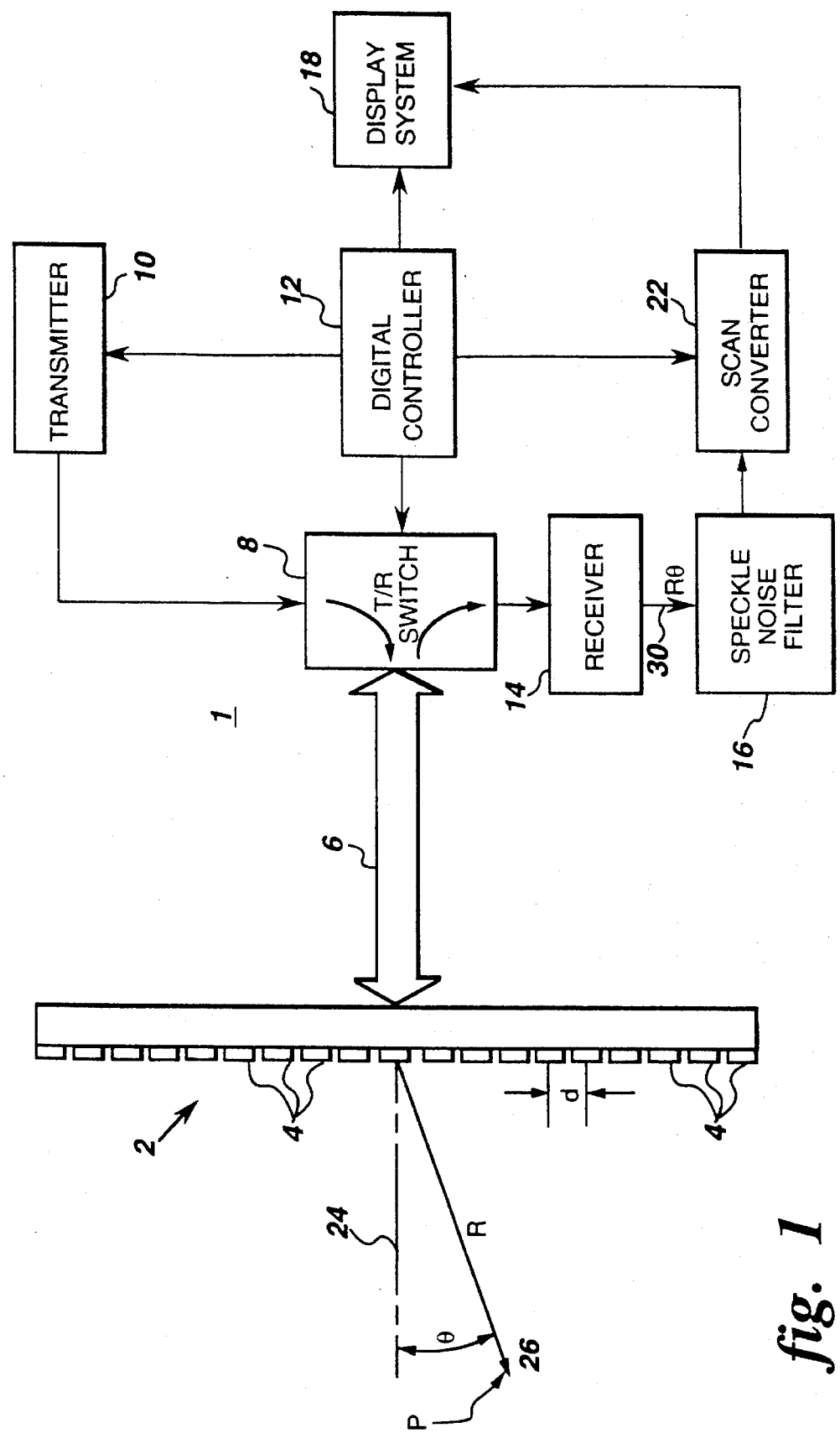
FIG. 1 is a block diagram of an ultrasonic imaging system which incorporates the present invention.

The ultrasonic imaging system incorporating the invention, as shown in FIG. 1, includes a transducer array 2 comprised of a plurality of separately driven transducers 4, each of which produces a burst of ultrasonic energy when energized by a pulsed waveform produced by a transmitter 10. The ultrasonic energy reflected back to transducer array 2 from the object under study is converted to an electrical signal by each receiving transducer 4 and applied separately to a receiver 14 through a set of transmit/receive (T/R) switches 8 via a multiplicity of channels 6. Transmitter 10, receiver 14 and switches 8 are operated under control of a digital controller 12 responsive to commands from a human operator. A complete scan is performed by acquiring a series of echoes in which switches 8 are set to their transmit position, transmitter 10 is gated ON momentarily to energize each transducer 4, switches 8 are then set to their receive position, and the subsequent echo signals produced by each transducer 4 are applied to receiver 14. The separate echo signals from each transducer 4 are combined in receiver 14 to produce a single echo signal which is used to produce a line in an image on a display system 18.

Transmitter 10 drives transducer array 2 such that the ultrasonic energy produced is directed, or steered, in a beam. To accomplish this, transmitter 10 imparts a time delay $T_i$ to the respective pulsed waveforms that are applied to successive transducers 4. By adjusting time delays $T_i$ appropriately in a conventional manner, ultrasonic beam 26 can be directed away from axis 24 by an angle θ and/or focused at a fixed range R. A sector scan is performed by progressively changing the time delays $T_i$ in successive excitations. The angle θ is thus changed in increments to steer the transmitted beam in a succession of directions.

The echo signals produced by each burst of ultrasonic energy reflect from objects located at successive ranges along the ultrasonic beam. The echo signals are sensed separately by each transducer 4 and a sample of the magnitude of the echo signal at a particular point in time represents the amount of reflection occurring at a specific range. Due to the differences in the propagation paths between a reflecting point P and each transducer 4, however, these echo signals will not be detected simultaneously and their amplitudes will not be equal. Receiver 14 amplifies the separate echo signals, imparts the proper time delay to each, and sums them to provide a single echo signal which accurately indicates the total ultrasonic energy reflected from point P located at range R along the ultrasonic beam oriented at the angle θ.

Under direction of digital controller 12, receiver 14 provides delays during the scan such that steering of receiver 14 tracks the direction θ of the beam steered by transmitter 10 and samples the echo signals at a succession of ranges R and provides the proper delays to dynamically focus at points P along the beam. Thus, each emission of an ultrasonic pulse waveform results in acquisition of a series of data points which represent the amount of reflected sound from a corresponding series of points P located along the ultrasonic beam.

The separate echo signals from each transducer element 4 are combined in receiver 14 to produce a single echo signal corresponding to a single scan line. Display system 18 receives the series of data samples produced by receiver 14 for all the scan lines after being converted by scan converter 22 to X-Y display coordinates. Scan converter 22 converts the (R-θ) signals into display (X-Y) coordinates, producing one frame of the desired image, which may be in wedge form for visual display.

In accordance with the present invention, a speckle noise filter 16 is situated between receiver 14 and scan converter 22 (see FIG. 1). Speckle filter 16 receives ultrasound signal 30, including range and depth information, or R-θ signals, from receiver 14. The speckle-reduced signal is then supplied from filter 16 to scan converter 22. The architecture of speckle filter 16 is generally shown in FIG. 2.

Figure 2:
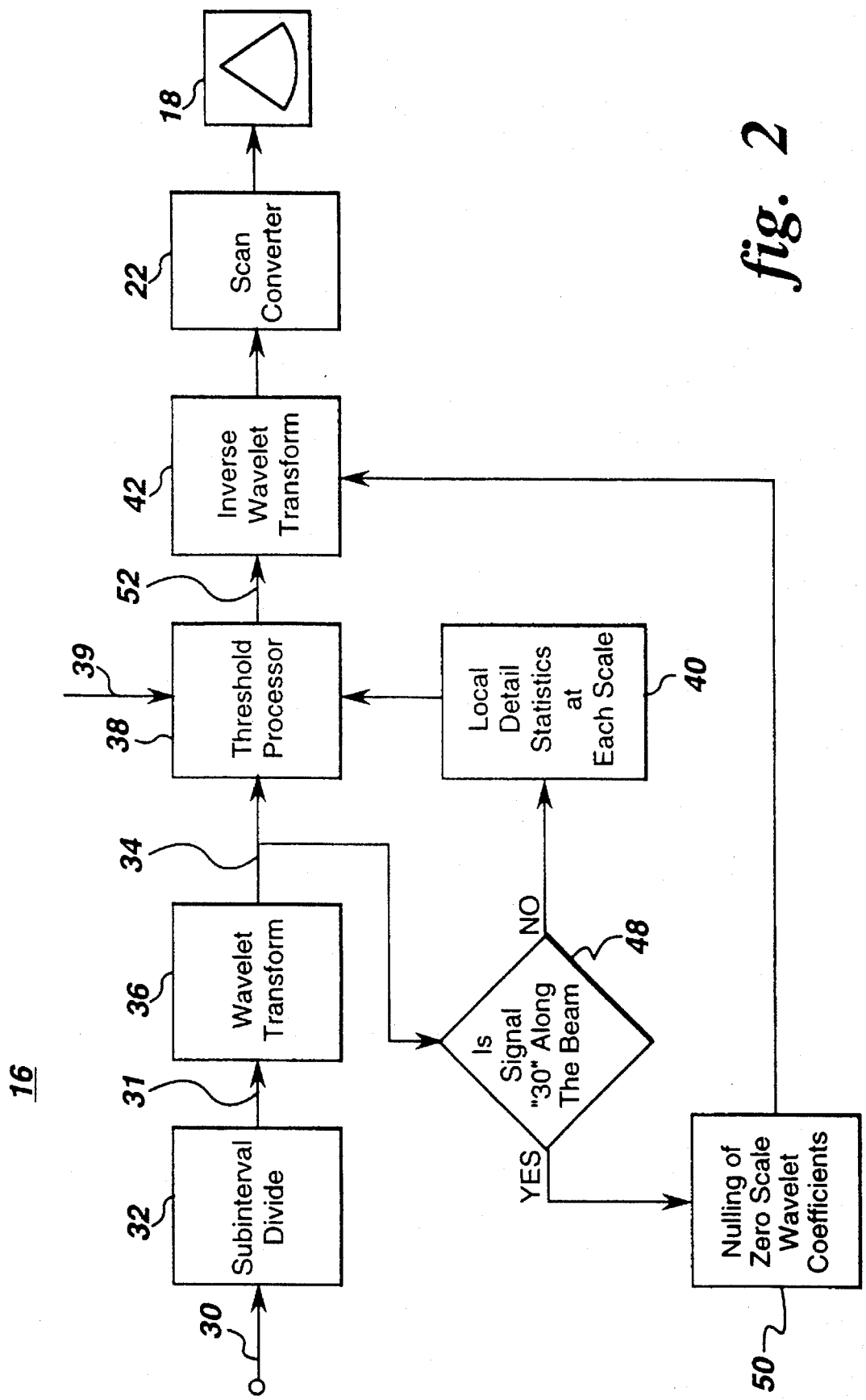
FIG. 2 is a block diagram showing details of the speckle filter of FIG. 1.

As shown in FIG. 2, speckle filter 16 comprises a subinterval divider 32, a wavelet transform 36, a threshold processor 38 and an inverse wavelet transform 42 connected in series. Subinterval divider 32 receives the ultrasound signal 30 from receiver 14 (see FIG. 1) for each beam angle θ and divides it into overlapping subintervals or segments of length L. The ultrasound range signals 31 produced by subinterval divider 32 are supplied to wavelet transform 36. For each subinterval, a discrete wavelet transform is applied by wavelet transform 36 to provide a hierarchical frequency-scale space representation 34.

Figure 3:
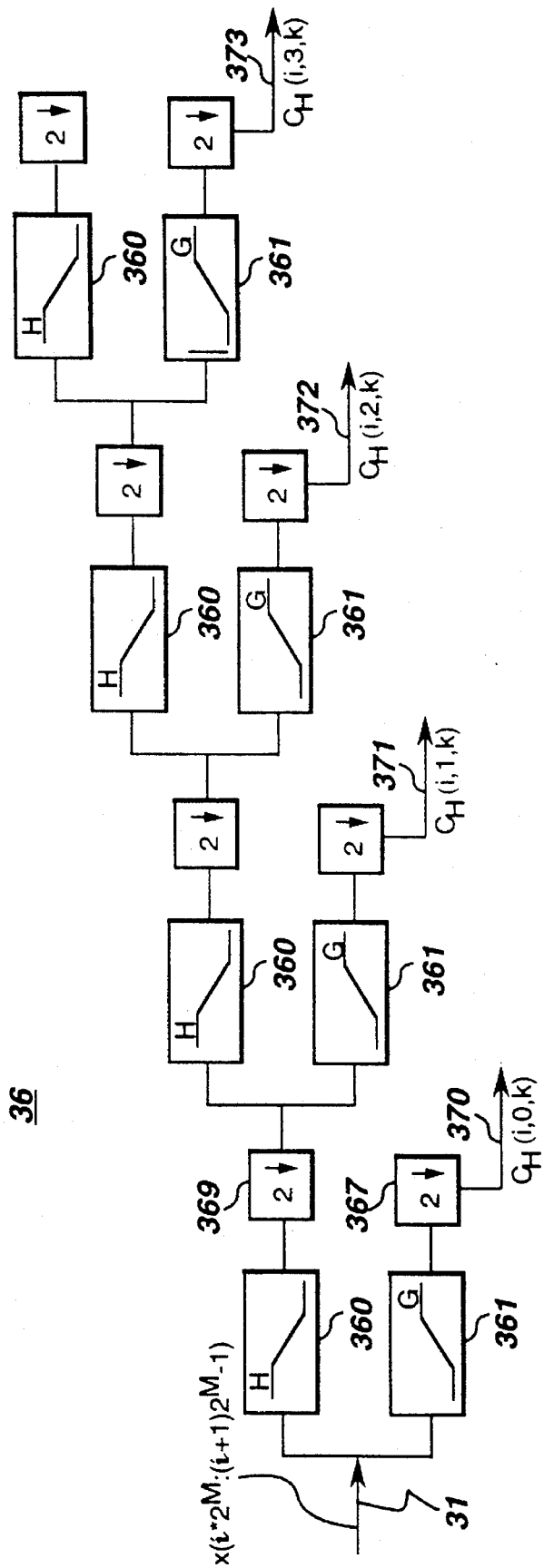
FIG. 3 is a block diagram of the wavelet transform processor of FIG. 2.

Details of wavelet transform processor 36 are shown in FIG. 3. A particular wavelet is specified by a particular set of numbers, i.e., wavelet filter coefficients, with the simplest wavelet having only four coefficients, namely, $C_0$, $C_1$, $C_2$ and $C_3$. Examples of suitable wavelets are the Haar wavelet and the Daubechies wavelet. These wavelets are discussed in "Wavelets: A Tutorial in Theory Applications" by Charles Chin, Academic Press Inc., London, UK (1992) and "The Wavelet Transform, True Frequency Localization and Signal Analysis" by I. Daubechies, IEEE Trans. Info. Theory, Vol. 41, pp. 961–1005 (1990), incorporated herein by reference. Unlike Fourier transforms, which utilize sines and cosines as their basis, wavelet functions are localized in space and, like sines and cosines, are also localized in frequency or, more precisely, characteristic scale. This dual localization characteristic of wavelets can provide high computational advantage when data are analyzed in the wavelet domain. Thus, as shown in FIG. 3, input signal 31 is provided to pairs of compute blocks or stages 360, 361, which are the digital filter realization of the wavelet transform. Compute block 360 is a smoothing filter H and illustrates the frequency response characteristics of filter H, which for a four-coefficient filter acts as a moving average of four samples of signal 31. Compute block 361 is a detail filter G, whose frequency response is a mirror image of that of smoothing filter H. Accordingly, filters H and G are referred to as quadrature mirror filters in digital signal processing terminology. Due to the mirror image relation of the frequency responses of filters H and G, the output signal of filter H block 360, decimated by a factor of 2 in divider 369, essentially "throws away" half the values, and accurately represents input signal 31 "smooth" information. The output signal of filter G block 361, similarly decimated by a factor of 2 in divider 367, accurately represents input signal 31 "detail" information.

As seen in FIG. 3, each successive stage of filters H and G acts on the output signal of the preceding filter H, so that compute blocks 361/367 produce as output signals the detail coefficient vectors 370, 371, 372 and 373. The coefficients are indicated by $C_H(i, j, k)$, wherein i is the index for coefficient location in a specific scale j and subinterval k, j is the index for wavelet scale (level of resolution) for a subinterval k, and k is the index for subinterval. Signal 370 produced by filter G of the first stage is the detail wavelet coefficient $C_H(i, 0, k)$ at scale zero, which is the finest resolution. Signal 371 produced by filter G of the second stage is the detail wavelet coefficient $C_H(i, 1, k)$ at scale one, which provides a lesser resolution. Similarly, signal 372 produced by filter G of the third stage is the detail wavelet coefficient $C_H(i, 2, k)$ at scale two, which provides a still lesser resolution, while signal 373 produced by filter G of the fourth stage is the detail wavelet coefficient $C_H(i, 3, k)$ at scale three, which provides the lowest resolution level of the four-coefficient filter.

Figures 4A, 7:
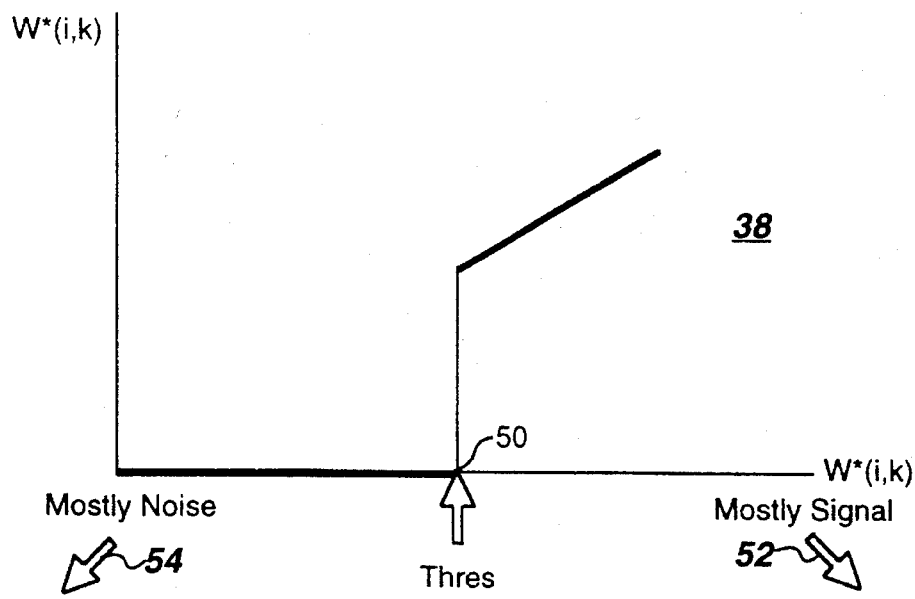
FIGS. 4A and 4B are diagrams useful in explaining identification of the intervals containing signal information in accordance with the present invention.
FIG. 7 is a simplified graph showing the filtering action involved in the wavelet transform.
Figure 4B:
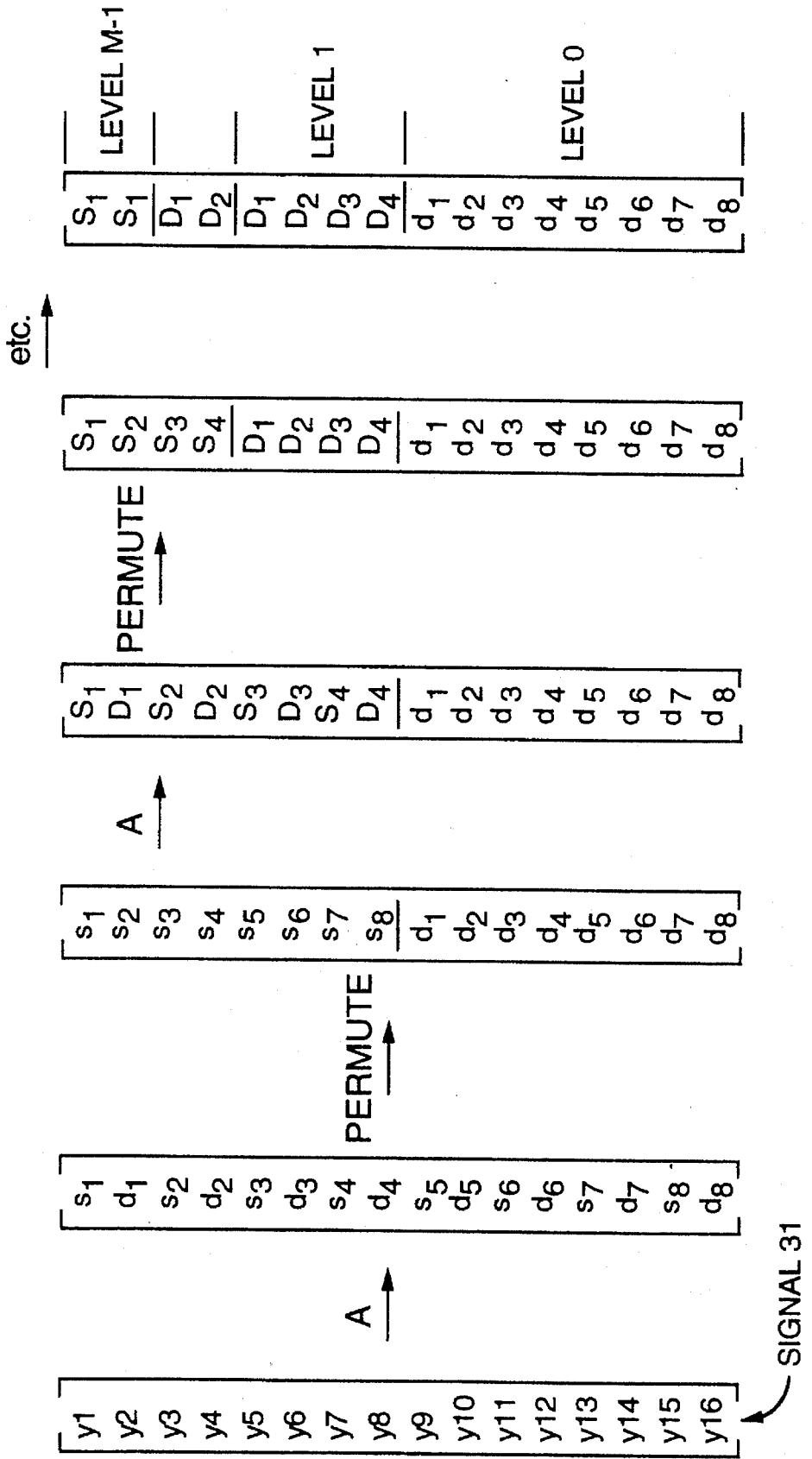

Input signal 31, representing a specific subinterval data sample, is transformed as a vector of sampled data $[x_0, x_1, \ldots, x_{n-1}]$ as shown in FIG. 4B. The wavelet transform coefficients for filters H and G are represented in FIG. 4A in the form of an orthogonal transformation matrix A which acts on the column vector of input signal 31 as described in detail in "Numerical Recipes: The Art of Scientific Computing" by W. Press et al., 2nd Ed., Cambridge Univ. Press, 1992, incorporated herein by reference. FIGS. 4A and 4B show the simplest wavelet form consisting of four coefficients $[C_0, C_1, C_2, C_3]$ representing the smoothing filter H and another four coefficients $[C_3, -C_2, C_1, -C_0]$ representing the detail filter G of FIG. 3. The blanks in the wavelet transform matrix A (see FIG. 4A) signify zeros. The odd rows of the matrix (labeling the rows beginning with 1) generate the components of the input data circularly convolved with the coefficients for smoothing filter H to produce the $C_L$ transform components 34 of FIG. 2. Likewise, the even rows perform the circular convolution of the data with the coefficients for detail filter G to produce the $C_H$ detail components of the transformed data. The overall action of the matrix is to perform two related circular convolutions, decimate each of them by half and interleave the remaining halves as shown in FIG. 4B.

The discrete wavelet transform consists of applying the wavelet coefficient matrix A hierarchically, first to the full (subinterval sample) data vector of length N, then to the "smooth" vector of length N/2, and so on, until there are only two smooth components and all the remaining components are "detail" components that were accumulated along the way, representing the "detail" information in the subinterval at various levels of resolution marked as level O (finest resolution) to level M-1 (coarsest resolution), where M is the total number of wavelet scales for a given subinterval.

The ability to separate the detail information from the input data stream at various selective scales (frequency bands) is unique to wavelet transformation. This enables the separation of wavelet transform "detail" coefficients that are due to the real or true signal from those due to signal-dependent noise such as speckle noise.

Threshold processor 38 (see FIG. 2) is provided to enable selection of those detail coefficients which primarily include true signal information. Local variance information at various selected scales is provided by means 40 to threshold processor 38 to enable selection of those wavelets which primarily include signal information. Selection may be accomplished automatically or by manually supplying the required thresholding factors into threshold processor 38 via manual input 39.

Figure 5:
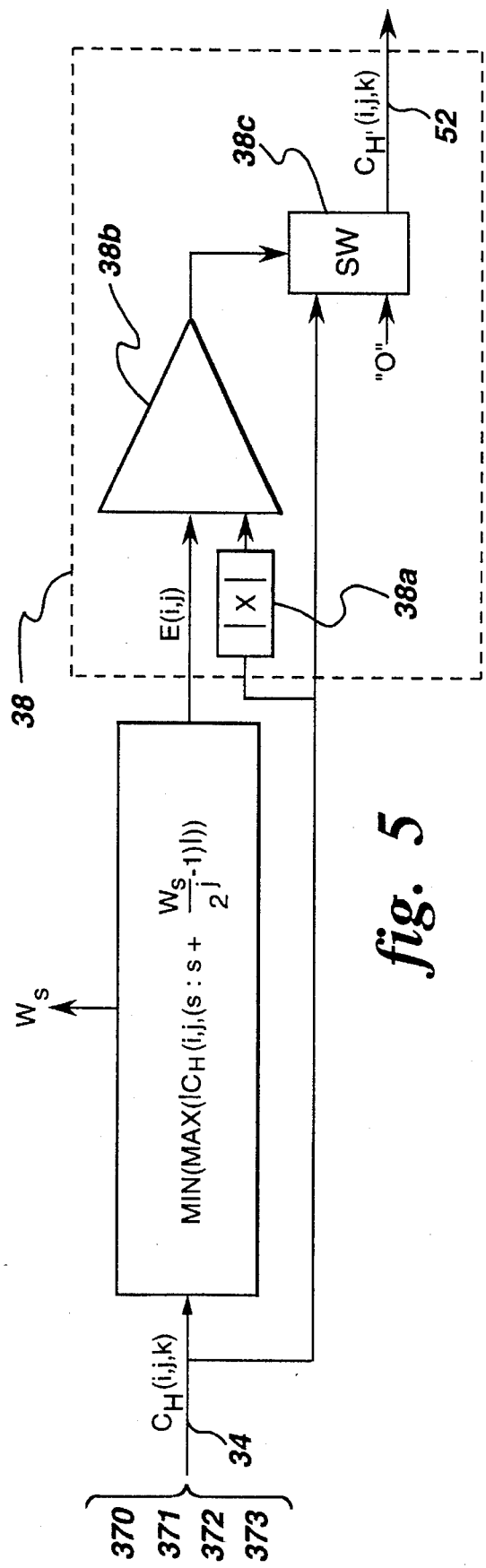
FIG. 5 is a block diagram of the threshold processor of FIG. 2.

The details of threshold processor 38 and processor means 40 are shown in FIG. 5, wherein detail coefficient vector output signals 370, 371, 372 and 373 of compute blocks 361/367 (see FIG. 3) are applied as input signal 34 to processor means 40. The coefficients are indicated by $C_H(i, j, k)$.

The thresholding factors may be selected by either automatic or manual control. In the automatic control method (FIG. 5), processor means 40 of FIG. 2 implements a nonlinear function for each scale (level of resolution) j=0 to (M-3) which compares each output signal C(i, j, k) over a user-defined sample length WL/2j for each j to determine the minimum of the $(2^{M-j-1}-WL/2j)$ maximum values of the absolute value (or the square) of the C(i, j, k) signal within the window WL/2j. This minimum is E(j, k). The starting points of each subinterval of length WL/2j goes from 0 to $(2^{M-j-1}-1-WL/2j)$. It is desirable to leave the last two coarsest wavelet scale coefficients unchanged, since these are nearly completely dominated by signal. Each C(i, j, k) signal within the specific scale j less than E(j, k) is zeroed while the others are unchanged. This is accomplished inside threshold processor 38 by a comparator 38b which compares the absolute value of signal C(i, j, k) from an absolute value converter 38a with the minimum of the maxima, namely, E(j, k) and then, depending on the result of the comparison, provides a control signal to switch 38c, which passes either input signal C(i, j, k) or input "0" to the output 52 of threshold processor 38, as signal C'(i, j, k).

In manual factor selection, for each scale (level), the operator determines the threshold factor multiplier depending on the amount of noise that can be removed with little compromise of signal resolution. Higher factor values result in more wavelet coefficients being zeroed out at that specific scale. Factors are determined based on what is visually acceptable quality (in the case of an image) to the user, and on the minimum loss of important signal information. After viewing the image, the operator adjusts the threshold level by manual adjustment via input 39 (FIG. 2), which may be manually varied to provide optimum image resolution.

Operation of threshold processor 38 is illustrated diagrammatically in FIG. 7. Threshold level ("Thres") 50 of threshold processor 38 is set either manually or automatically, as described above. The wavelet components 52 above the threshold level and representing mostly true image signal 30 (FIG. 2) are retained and passed to inverse wavelet transform 42; while those wavelet components 54 representing mostly speckle or other signal-dependent noise are zeroed out.

Threshold processor 38 thus eliminates noise without distortion of the true image signal. The inverse wavelet transform 42 is a simple reverse of the procedure of FIG. 3, starting with the smallest level of resolution and working from right to left in FIG. 3, and multiplying by the inverse of the transform matrix A (given in FIG. 4A) which, due to the condition of orthogonality, is equal to the transpose of the matrix (i.e., $A^{-1}=A^T$) for orthogonal matrices. After the thresholding operation is completed, the remaining wavelet coefficients C'(i, j, k) are inverse wavelet transformed to produce the denoised signal (speckle-reduced subinterval).

Figure 6:
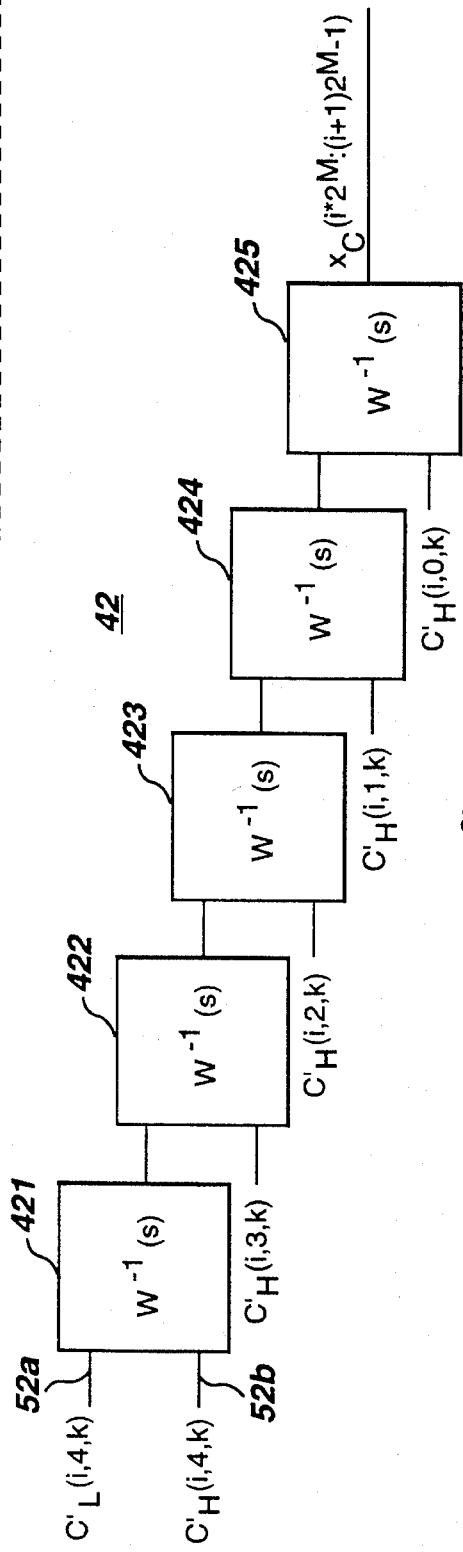
FIG. 6 is a block diagram of the inverse wavelet transform processor of FIG. 2.

The details of inverse wavelet transform processor 42 are shown in FIG. 6, and such processor is described in detail in "Numerical Recipes: The Art of Scientific Computing" by W. Press et al., 2nd Ed., Cambridge University Press, 1992, incorporated herein by reference. The processor operates on the C'(i, j, k) data stream 52. This is repeated for all subintervals until the whole ultrasound signal 30 is processed.

As shown in FIG. 2, the output signal of inverse wavelet transform 42, including the processed and enhanced (with reduced speckle) range-theta image 31, is applied to scan converter 22. The scan converter, in a manner well known in the ultrasound art, transforms the beams by linearly interpolating between beams to provide a continuous wedge-shaped display through conversion of the range-theta signals into X-Y coordinates for display by display system (or display unit) 18.

The above-described method constitutes the basic approach for filtering speckle noise using nonlinear adaptive thresholding of the received echo wavelet transform coefficients. The present invention is an improvement in the above-described method and is applicable when the received signals are in the range-theta domain, i.e., before scan conversion.

Figure 8:
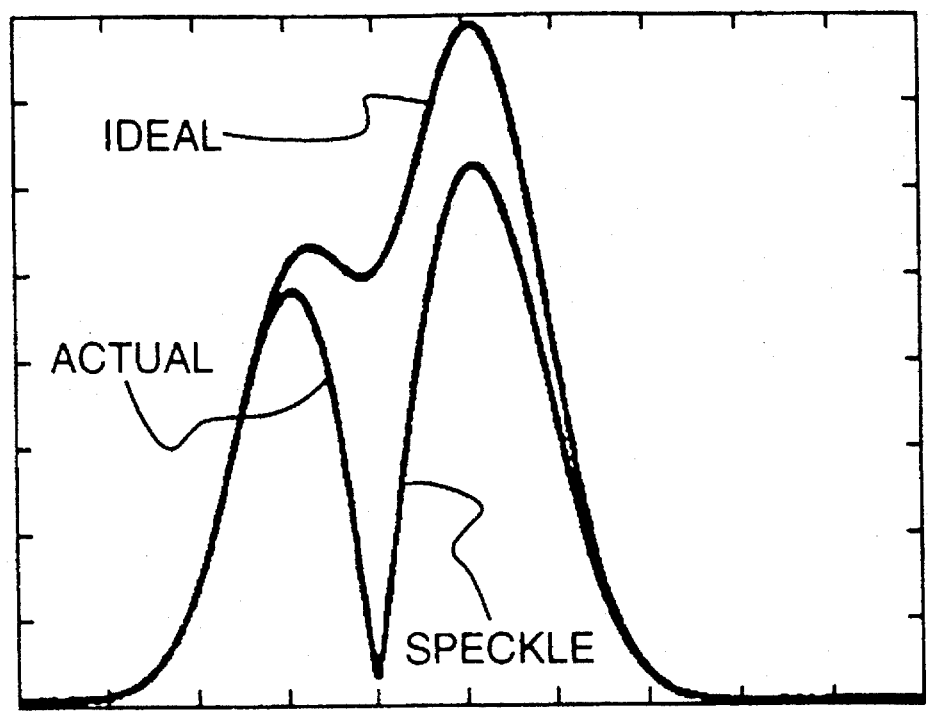
FIG. 8 graphically depicts "speckle deficit" as the difference between "actual" and "ideal" radiofrequency (rf) A-line envelopes. This graph appears in an article by Leeman et al. entitled "Speckle Reduction in Two Easy Steps", Proc. IEEE Ultrasonics Symposium (1989), pp. 927–930.

The main advantage of the present invention over the basic approach outlined above derives from the fact that the method of the invention takes into account of the physical properties of speckle. FIG. 8 depicts a computer simulation by Leeman et al. using a simple discrete scatterer model, and shows the difference between the "actual" received echo envelope, as obtained from the overlapping and interfering echoes from the ultrasound scatterers, and an "ideal" envelope, which indicates the actual reflectivity function (local scattering strength), as smoothed by the resolution of the simulated imaging system. If speckle is viewed as being discontinuities (i.e., dips) in the received echo envelope, then these characteristic dips give rise to high-energy wavelet coefficients that exist only at the first wavelet scale (i.e., the highest spatial frequency scale).

The image enhancement results from the fact that all of the wavelet coefficients at the highest resolution wavelet scale can be completely zeroed out, while applying nonlinear thresholding to the following wavelet scales having a resolution below that of the finest-resolution wavelet scale. This has the immediate advantage of eliminating the dark spots that normally result from not deleting all the wavelet coefficients corresponding to the echo envelope dips at the finest scale. The by-product benefit is the amount of signal/image compression that results from eliminating the finest-resolution wavelet scale coefficients. For a typical ultrasound imaging machine, the invention, at a minimum, will reduce by one-half (i.e., 2:1 compression) the amount of cine memory required if the images are stored in the wavelet domain after this denoising technique is applied.

The image enhancement of the present invention can only be realized if the input data are in the range-theta domain. The echo envelope dip concept does not apply to scan-converted data since the interpolation involved in the scan conversion process destroys the sudden intensity dip characteristic of the speckle. Hence the process of nulling all the finest-scale wavelet coefficients cannot be applied downstream of the scan converter.

The method of the invention is a denoising procedure in the range-theta domain comprising two one-dimensional procedures. The method operates first on the range signals for each beam; then the resultant filtered range data are filtered across beams for each range sample. The steps of the method in accordance with the preferred embodiment of the invention are as follows.

Steps (1) through (5) are performed for the sampled amplitudes at each beam angle:

(1) Subinterval Divide: Divide the signal into overlapping subintervals of length L, as previously described in the discussion of subinterval divider 32 in FIG. 2. Steps (2) through (5) are performed for each subinterval comprising the sampled range signal.

(2) Discrete Wavelet Transform: For each subinterval, apply the hierarchical discrete wavelet transformation (for M wavelet scales), as previously described with reference to wavelet transform 36 in FIG. 2. In the following we choose M=7 for illustration.

(3) Delete all wavelet coefficients at the finest scale, j=0 (representing the A-line dip contributions to high coefficient values in the wavelet domain). This is accomplished, as indicated in FIG. 2, by providing image signal 34 with a decision step 48, which determines whether image signal 34 is along the beam (in the θ direction). On the one hand, if image signal 34 is not along the beam, then signal 34 is supplied to processor 40, which computes the minimum of all the maxima of the absolute value of the coefficients within a predefined interval WL, as previously described. On the other hand, if image signal 34 is along the beam, then signal 34 undergoes a nulling step 50, at which the zero-scale wavelet coefficients for each beam angle in the inverse wavelet transform 42 are nulled, that is, the input signal C'H(i, 0, k) to processor 425 in FIG. 6 is set equal to zero. The number of wavelet coefficients deleted will be L/2, which is a 50% reduction in the number of wavelet coefficients representing the filtered speckle-reduced range-theta data.

(4) Wavelet Coefficient Thresholding: For each of the next three wavelet scales (j=1 to 3), determine the wavelet coefficients which are due to noise and those that are due to the information-carrying signal, using either the automatic or manual methods described above. The wavelet coefficients at the last three wavelet scales (j=4 to 6) are left unchanged.

(5) Inverse Discrete Wavelet Transform: After deleting the noise-related wavelet coefficients, the remaining coefficients from each scale (level of resolution) are passed through the inverse transform to produce the speckle-reduced subinterval.

Steps (2) through (5) are repeated for each subinterval signal comprising the sampled range amplitude signal.

Then the following one-dimensional filtering is performed on the once-filtered amplitude signals. For the filtered amplitudes at each range:

(6) divide a sampled beam angle amplitude signal into a number of overlapping subinterval signals of equal length L';

(7) transform each of the subinterval signals using discrete wavelet transformation to provide wavelet transform coefficients for each of a plurality of wavelet scales having different levels of resolution ranging from a finest wavelet scale to a coarsest wavelet scale;

(8) for each wavelet scale, identify for each of the subinterval signals which of the wavelet transform coefficients are related to noise and which are related to a true signal through the use of the adaptive nonlinear thresholding;

(9) select only those wavelet transform coefficients which are identified as being related to a true signal;

(10) inverse transform the selected wavelet transform coefficients using an inverse discrete wavelet transformation to provide a speckle-reduced beam angle amplitude signal; and repeat steps (6)–(10) for each subinterval signal comprising the sampled beam angle amplitude signal to provide a speckle-reduced range-beam angle image.

Figure 9A:
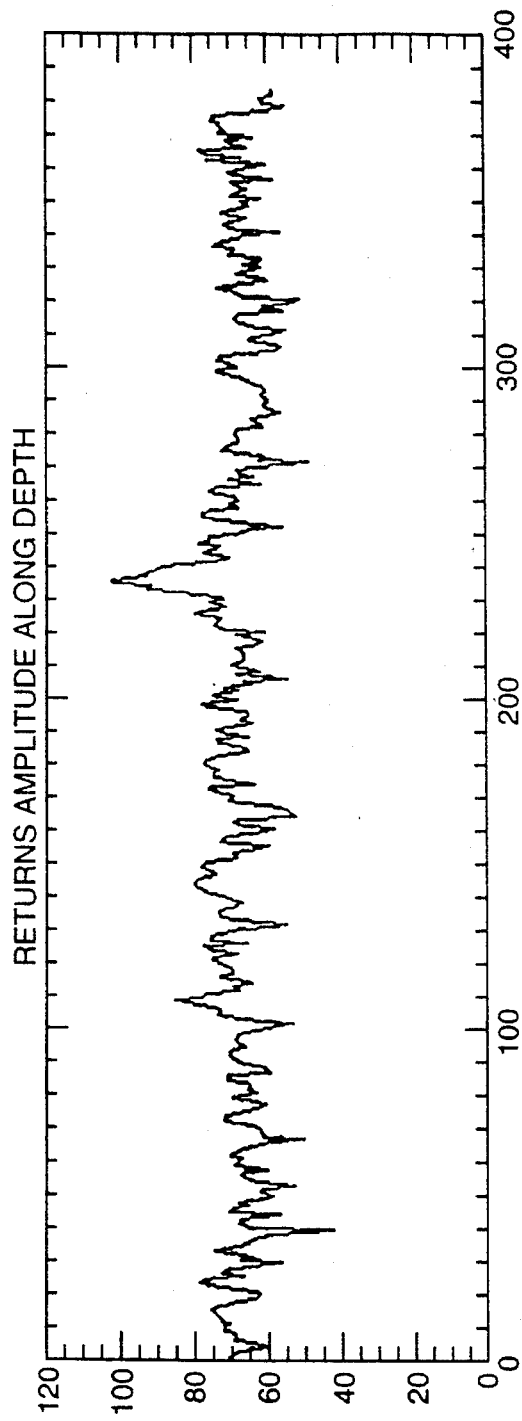
FIGS. 9A and 9B are respective plots of rf amplitude (ordinate) versus depth (abscissa) for a range-theta signal before and after speckle reduction in accordance with the method of the present invention.
Figure 9B:
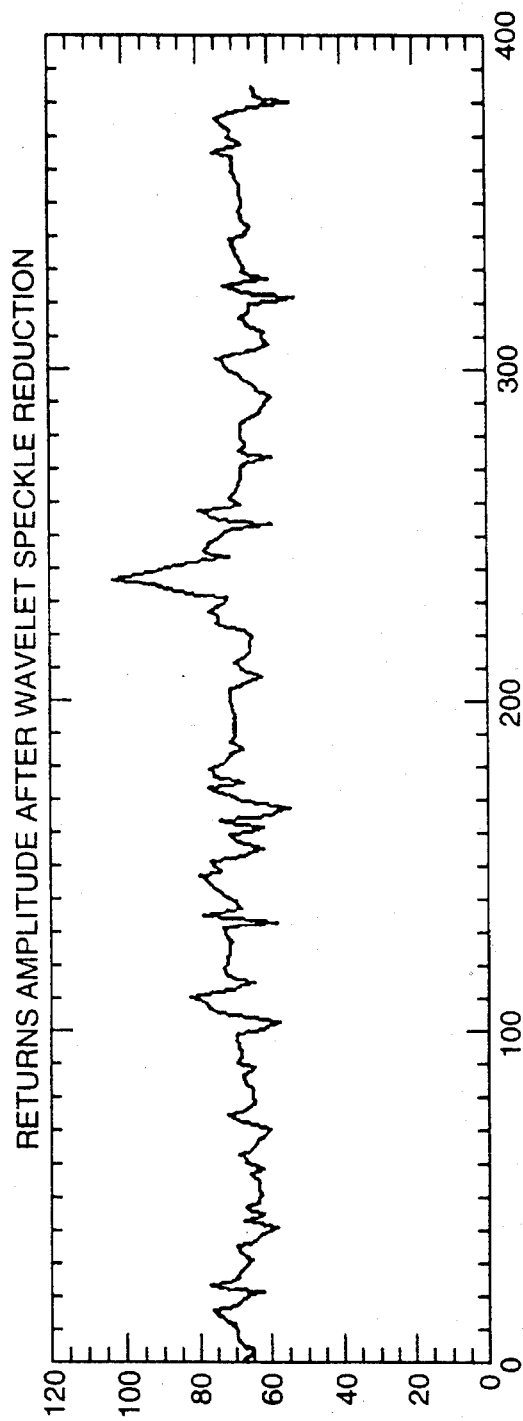
Figure 10D:
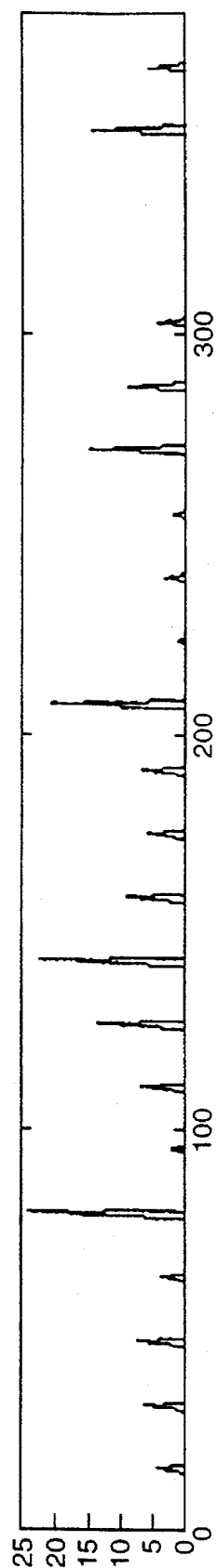
Figure 10E:
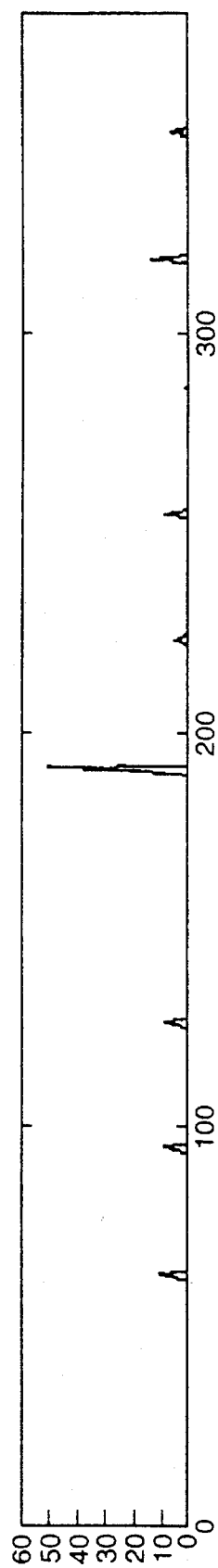
Figure 10F:
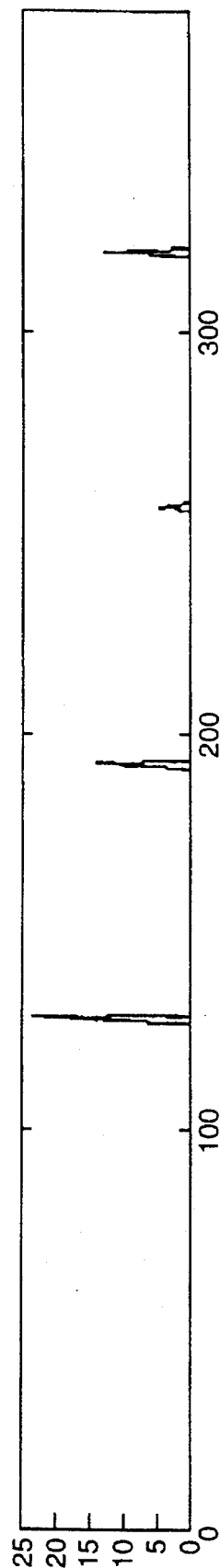
Figure 10G:
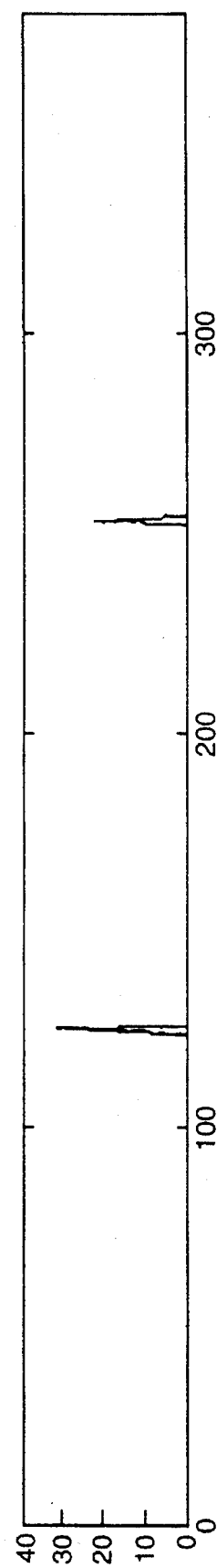

FIGS. 9A and 9B show the range-theta signal amplitude before and after, using the enhanced speckle reduction technique of the present invention. The signal is much cleaner after speckle reduction. FIGS. 10A through 10G are plots of the wavelet coefficients of the filtered data shown in FIG. 9B for wavelet scales 0 through 6, respectively.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An adaptive method for reducing signal-dependent noise mixed with a true signal in a coherent imaging system signal, comprising the steps of:

for sampled amplitudes at each beam angle:

(a) dividing a sampled range amplitude signal into a number of first subinterval signals of equal length:

(b) transforming each of said first subinterval signals using discrete wavelet transformation to provide first wavelet transform coefficients for each of a plurality of first wavelet scales having different levels of resolution ranging from a first finest wavelet scale to a first coarsest wavelet scale:

(c) for each transformed beam subinterval, deleting all of the first wavelet transform coefficients representing said finest first wavelet scale;

(d) for each said first wavelet scale other than said finest first wavelet scale, identifying for each of said first subinterval signals which of said first wavelet transform coefficients are related to noise and which are related to a true signal through use of adaptive nonlinear thresholding;

(e) setting to zero those first wavelet transform coefficients which are identified as being related to noise:

(f) inverse transforming the so modified first wavelet transform coefficients using an inverse discrete wavelet transformation to provide a filtered range amplitude signal;

repeating steps (b)–(f) for each subinterval signal comprising said sampled range amplitude signal: and for filtered amplitudes at each range:

(g) dividing a sampled beam angle amplitude signal into a number of second subinterval signals of equal length:

(h) transforming each of said second subinterval signals using discrete wavelet transformation to provide second wavelet transform coefficients for each of a plurality of second wavelet scales having different levels of resolution ranging from a finest second wavelet scale to a coarsest second wavelet scale;

(i) for each second wavelet scale, identifying for each of said second subinterval signals which of said second wavelet transform coefficients are related to noise and which are related to a true signal through the use of adaptive nonlinear thresholding;

(j) setting to zero those second wavelet transform coefficients which are identified as being related to noise;

(k) inverse transforming the so modified second wavelet transform coefficients using an inverse discrete wavelet transformation to provide a speckle-reduced beam angle amplitude signal; and repeating steps (h)–(k) for each subinterval signal comprising said sampled beam angle amplitude signal to provide a speckle-reduced range-beam angle image.

2. The adaptive method as defined in claim 1, wherein said adaptive nonlinear thresholding for each said first wavelet scale comprises the steps of:

within a predefined interval, finding for each said first wavelet scale other than the finest first wavelet scale the maximum value of the absolute value of the first wavelet transform coefficients for each said first subinterval signal;

setting the threshold for each said first wavelet scale equal to the minimum of the maximum values for the corresponding wavelet scale, except for the finest first wavelet scale and for the two coarsest first wavelet scales;

setting the threshold for the two coarsest first wavelet scales of said first wavelet transform equal to zero;

within another predefined interval, finding for each said second wavelet scale the maximum value of the absolute value of the second wavelet transform coefficients for each said second subinterval signal;

setting the threshold for each said second wavelet scale equal to the minimum of the maximum values for the corresponding wavelet scale, except for the two coarsest second wavelet scales; and setting the threshold for the two coarsest second wavelet scales of said second wavelet transform equal to zero.

3. The adaptive method as defined in claim 2, wherein the first selecting step comprises zeroing out all first wavelet transform coefficients having an absolute value less than said threshold set for each said first wavelet scale and passing unchanged said first wavelet transform coefficients having an absolute value which is not less than said threshold set for each said first wavelet scale, and wherein the second selecting step comprises setting to zero all second wavelet transform coefficients having an absolute value less than said threshold set for each said second wavelet scale and passing unchanged said second wavelet transform coefficients having an absolute value which is not less than said threshold set for each said second wavelet scale.

4. The adaptive method as defined in claim 1, wherein the thresholds and the interval lengths are operator selectable.

5. The adaptive method as defined in claim 1, wherein the thresholds are adaptively determined.

6. A speckle noise filter for an ultrasound imaging system, comprising:

means for dividing a sampled range signal into a number of subinterval signals of equal length for each beam;

means for transforming each of said subinterval signals using discrete wavelet transformation to provide wavelet transform coefficients for each of a plurality of wavelet scales having different levels of resolution ranging from a finest wavelet scale to a coarsest wavelet scale;

means for deleting all of the wavelet transform coefficients representing said finest wavelet scale for each transformed beam subinterval;

adaptive nonlinear thresholding means for identifying which of said wavelet transform coefficients are related to noise and which are related to a true signal for those subinterval signals corresponding to wavelet scales other than said finest wavelet scale;

means for selecting only those wavelet transform coefficients which are identified as being related to a true signal; and means for inverse transforming said selected wavelet transform coefficients using an inverse discrete wavelet transformation to provide an enhanced true signal with reduced noise.

7. The speckle noise filter as defined in claim 6, wherein said adaptive nonlinear thresholding means comprises:

means for finding for each of said wavelet scales, except for the two coarsest wavelet scales, a maximum value of the absolute value of the wavelet transform coefficients for each of said subinterval signals;

means for setting a threshold for each of said wavelet scales, except for the two coarsest wavelet scales, equal to a minimum of the maximum values for the corresponding wavelet scale; and means for setting a threshold for each of the two coarsest wavelet scales equal to zero.

8. The speckle noise filter as defined in claim 7, wherein said selecting means comprises means for setting to zero all of said wavelet transform coefficients having an absolute value less than said threshold and passing unchanged said wavelet transform coefficients having an absolute value which is not less than said threshold.

9. An ultrasound imaging system comprising:

an array of transducers;

means for selectively operating said transducers in a transmission mode to produce propagating pulses from electrical signals, said electrical signals being timed to produce transmitted ultrasound beams focused at selected points;

means for selectively operating said transducers in a reception mode to produce electrical detection signals from received ultrasound echoes, said electrical detection signals being delayed and summed to produce sampled range signals which are dominated by the received echoes reflected from respective focal points;

a speckle noise filter for filtering out speckle noise included in said sampled range signals;

a scan converter for scan converting said filtered range signals into X-Y display coordinates; and a display monitor for displaying a series of data samples produced by said means for selectively operating said transducers in a reception mode and scan convened by said scan converter, wherein said speckle noise filter comprises:

means for dividing the sampled range signal into a number of subinterval signals of equal length for each of said beams;

means for transforming each of said subinterval signals using discrete wavelet transformation to provide wavelet transform coefficients for each of a plurality of wavelet scales having different levels of resolution ranging from a finest wavelet scale to a coarsest wavelet scale;

means for deleting all of the wavelet transform coefficients representing said finest wavelet scale for each of the transformed beam subintervals;

adaptive nonlinear thresholding means for identifying which of said wavelet transform coefficients are related to noise and which are related to a true signal for those of said subinterval signals corresponding to a wavelet scale other than said finest wavelet scale;

means for setting to zero those wavelet transform coefficients which are identified as being related to noise; and means for inverse transforming the so modified wavelet transform coefficients using an inverse discrete wavelet transformation to provide an enhanced true signal with reduced noise.

10. The ultrasound imaging system as defined in claim 9, wherein said adaptive nonlinear thresholding means comprises:

means for finding for each of said wavelet scales, except for the two coarsest wavelet scales, a maximum value of the absolute value of the wavelet transform coefficients for each of said subinterval signals;

means for setting a threshold for each of said wavelet scales, except for the two coarsest wavelet scales, equal to a minimum of the maximum values for the corresponding wavelet scale; and means for setting a threshold for each of the two coarsest wavelet scale equal to zero.

11. The ultrasound imaging system as defined in claim 10, wherein the selecting means comprises means for setting to zero all of the wavelet transform coefficients having an absolute value less than said threshold and passing unchanged the wavelet transform coefficients having an absolute value which is not less than said threshold.

* * * * *